United States Patent [19]
Elleder et al.

[11] Patent Number: 6,139,301
[45] Date of Patent: Oct. 31, 2000

[54] EQUIPMENT FOR ADJUSTMENT OF CLAMPING PLATE HEIGHT

[75] Inventors: Pavel Elleder; Jiří Forejt, both of Plzeň, Czech Rep.

[73] Assignee: SKODA TS A.S., Czech Rep.

[21] Appl. No.: 09/124,919

[22] Filed: Jul. 30, 1998

[30] Foreign Application Priority Data

Aug. 8, 1997 [CS] Czechoslovakia ................ 2518-97

[51] Int. Cl.⁷ .................................................. B29C 35/02
[52] U.S. Cl. ............................................. 425/28.1; 425/47
[58] Field of Search .............................. 425/28.1, 34.1, 425/34.3, 47

[56] References Cited

U.S. PATENT DOCUMENTS

| | | | |
|---|---|---|---|
| 2,345,838 | 4/1944 | Soderquist et al. | 425/47 |
| 2,424,915 | 7/1947 | Bosomworth et al. | 425/47 |
| 3,817,670 | 6/1974 | Leblond | 425/47 |
| 4,383,808 | 5/1983 | Kubo et al. | 425/47 |
| 4,390,334 | 6/1983 | Singh et al. | 425/47 |
| 4,563,139 | 1/1986 | Yokoyama et al. | 425/47 |
| 4,669,964 | 6/1987 | Amano et al. | 425/34.1 |
| 4,927,344 | 5/1990 | Amano et al. | 425/34.1 |
| 5,082,434 | 1/1992 | Tomita et al. | 425/47 |
| 5,683,726 | 11/1997 | Mitamura et al. | 425/47 |
| 5,820,886 | 10/1998 | Irie | 425/47 |

OTHER PUBLICATIONS

Bag–O–Matic Tire Press, Kobe Steel, 1985.
Drawing, Pricny Rez Parni Komorou, vol. 55, Typ 05713 (undated).

*Primary Examiner*—James P. Mackey
*Attorney, Agent, or Firm*—Burns, Doane, Swecker & Mathis, LLP

[57] ABSTRACT

The invention relates to a device for adjustment of the clamping plate height in a curing press steam chamber. The height adjustability allows the clamping plate to be attached to different size tire molds to produce tires of different sizes in a single steam chamber. The device for adjustment of the height of the clamping plate in a steam chamber includes a plurality of hydraulic cylinders between the upper and/or lower part of the steam chamber and the clamping plate within the steam chamber.

15 Claims, 3 Drawing Sheets

EQUIPMENT FOR ADJUSTMENT OF CLAMPING PLATE HEIGHT

This application claims priority under 35 U.S.C. §§119 and/or 365 to PV 2518-97 filed in the Czech Republic on Aug. 8, 1997; the entire content of which is hereby incorporated by reference.

BACKGROUND OF THE INVENTION

1. Field of the Invention

The invention relates to a device for adjusting the height of a clamping plate of a mold of a curing press steam chamber. The height adjustability allows the clamping plate to be attached to different size molds to produce tires of different sizes in one steam chamber.

2. Description of the Related Art

Individual parts of tire forming molds are fixed in corresponding parts of a steam chamber. A single steam chamber can accommodate molds of different sizes so that tires of various sizes can be manufactured. Therefore, it is necessary to compensate for the different heights of different size molds by height readjustment so that the molds after closing the steam chamber, adhere perfectly to each other causing the formation of a flash in a parting plane of the produced tire, and at the same time, forming a hermetic seal between the parts of the steam chamber.

Both parts of the steam chamber are usually hermetically closed by action of a crank mechanism or by means of pressure cylinders located between a frame and one half of the steam chamber, or between the two halves of the steam chamber. According to one known solution, both parts of the steam chamber are connected by a lug type closure usually designed as a system of wedge recesses and projections formed on edges of both chambers, and in a hoop that encircles them. By slightly turning the hoop, the parting plane between the parts of the steam chamber is gripped. When a mold size used in the steam chamber is changed, the upper part of the mold is usually rearranged in the steam chamber. The mold clamping plate is designed in known constructions to be readjustable in the upper part of the steam chamber. Readjustability of the clamping plate is provided by an adjusting screw joint placed along an axis of the steam chamber and the mold. The screw joint goes through a bottom of the upper part of the steam chamber and is partly located inside of the steam chamber, especially when molds of smaller dimensions are used. Due to an intensity of transmitted force it is necessary to choose a screw joint with a thread of a larger diameter because the screw joint is very prone to seizing after exposure to a direct effect of technological steam.

SUMMARY OF THE INVENTION

The above mentioned deficiencies are addressed by the equipment for adjustment of mold clamping plate height in a curing press steam chamber according to the present invention. Between the upper and/or lower part of the steam chamber and a corresponding clamping plate there is located a group of hydraulic cylinders that, after the steam chamber has been closed, induce a required pressure for gripping of both parts of the molds, and thus prevent the formation of a flash.

The individual hydraulic cylinders may be provided with stroke sensors for an indication of a position of piston shift-out and subsequent control of the piston stroke.

Between the clamping plate and each of the hydraulic cylinders there may be adjusting screws that allow molds of various sizes to be located in the steam chamber.

It is possible to connect a nut with the piston and the adjusting screw with the clamping plate as well as, vice versa, connecting the nut with the clamping plate and the adjusting screw with the piston.

For compactness of design, the adjusting screw may be placed in a hollow of the piston.

In the design where the nut is connected with the clamping plate, the adjusting screw may be a part of the piston, the result of which is a shortening of an adjusting height.

It is also desirable to induce rotary motion of the nut with respect to the adjusting screw, by means of worm gearing because of a high passive resistance between the nut and screw.

Simultaneous motion of a plurality of worm gears associated with a plurality of hydraulic cylinders can be induced by a mutual interconnection of gears that are joined to a common source of torsional moment.

BRIEF DESCRIPTION OF THE DRAWING FIGURES

DETAILED DESCRIPTION OF THE PREFERRED EMBODIMENTS

Figure 1:
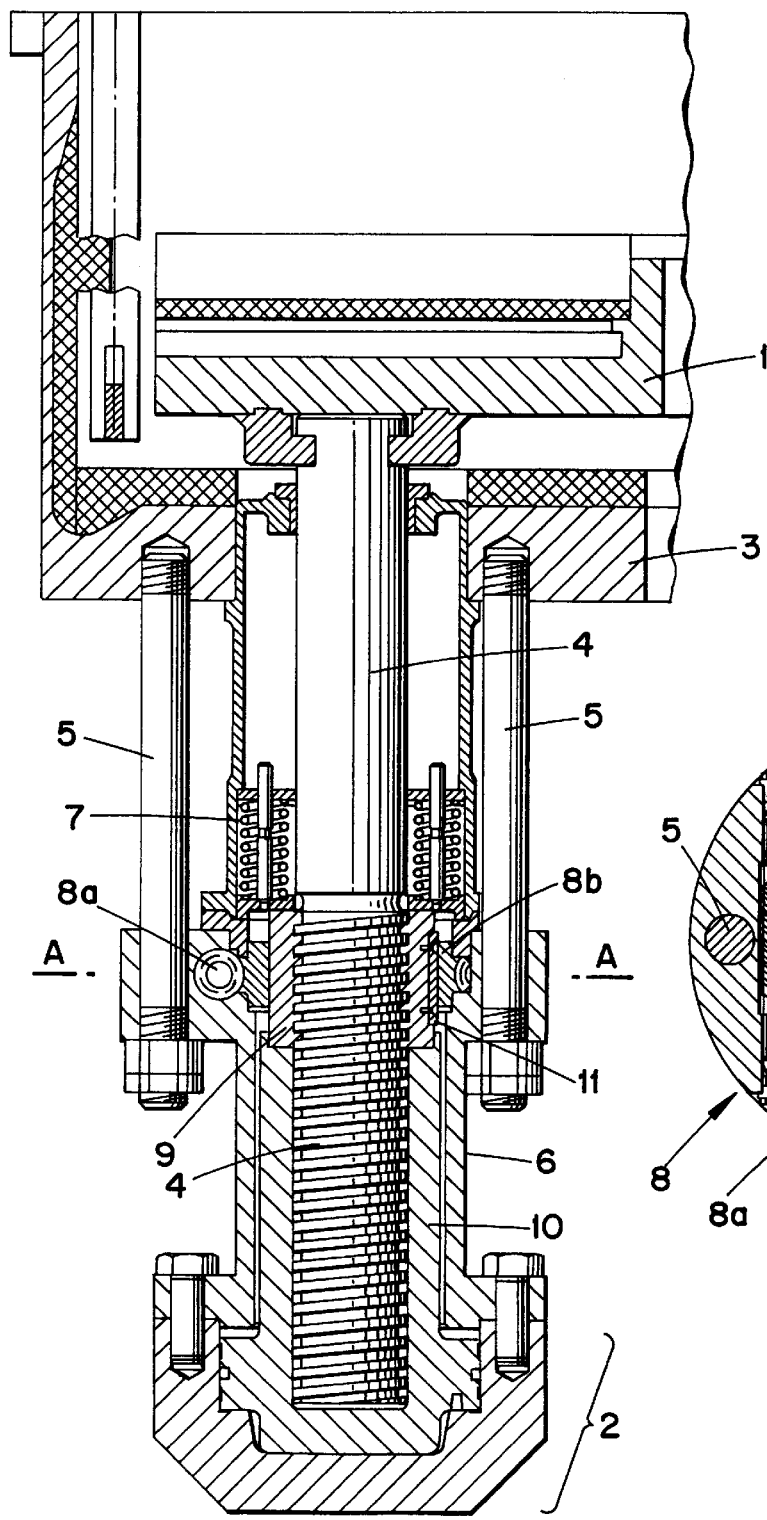
FIG. 1 is a side cross sectional view of a portion of a steam chamber and equipment for adjustment of clamping plate height according to the first embodiment of the invention.

In the embodiment of FIG. 1, an adjusting screw 4 goes through a bottom of a lower part of a steam chamber 3. Sealing between the adjusting screw 4 and the steam chamber 3 wall is provided by a sealing member. Adjusting screw 4 is fixed by its upper end in the mold clamping plate 1. The lower end of the adjusting screw 4 is placed in a hollow of the piston 10 that is the part of hydraulic cylinder 2. The barrel 6 of the hydraulic cylinder 2 is attached to the steam chamber 3 by means of bolts 5. A nut 9 is threaded onto the adjusting screw 4. The nut 9 adjoins a top surface of the piston 10. The nut 9 can be turned by action of the worm gearing 8.

Figure 2:
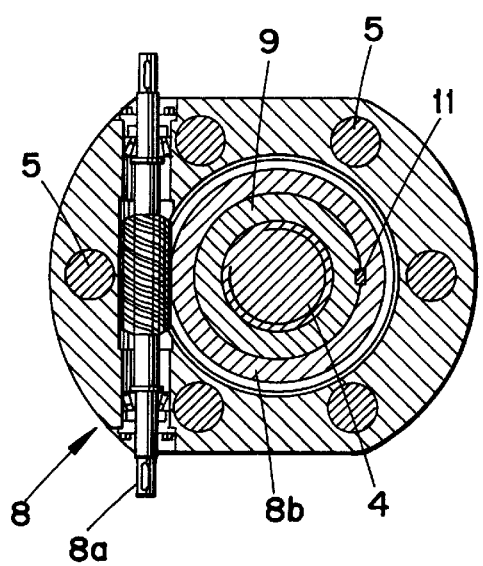
FIG. 2 is a cross sectional view of the embodiment of FIG. 1 taken along line A—A.

As shown in FIG. 2, the worm wheel 8b is mounted on the nut 9 by means of a spring 11. The worm wheel 8b is longitudinally slidable on the nut 9. The worm 8 is placed in the barrel 6. Between the nut 9 and steam chamber 3 is the spring 7.

Figure 3:
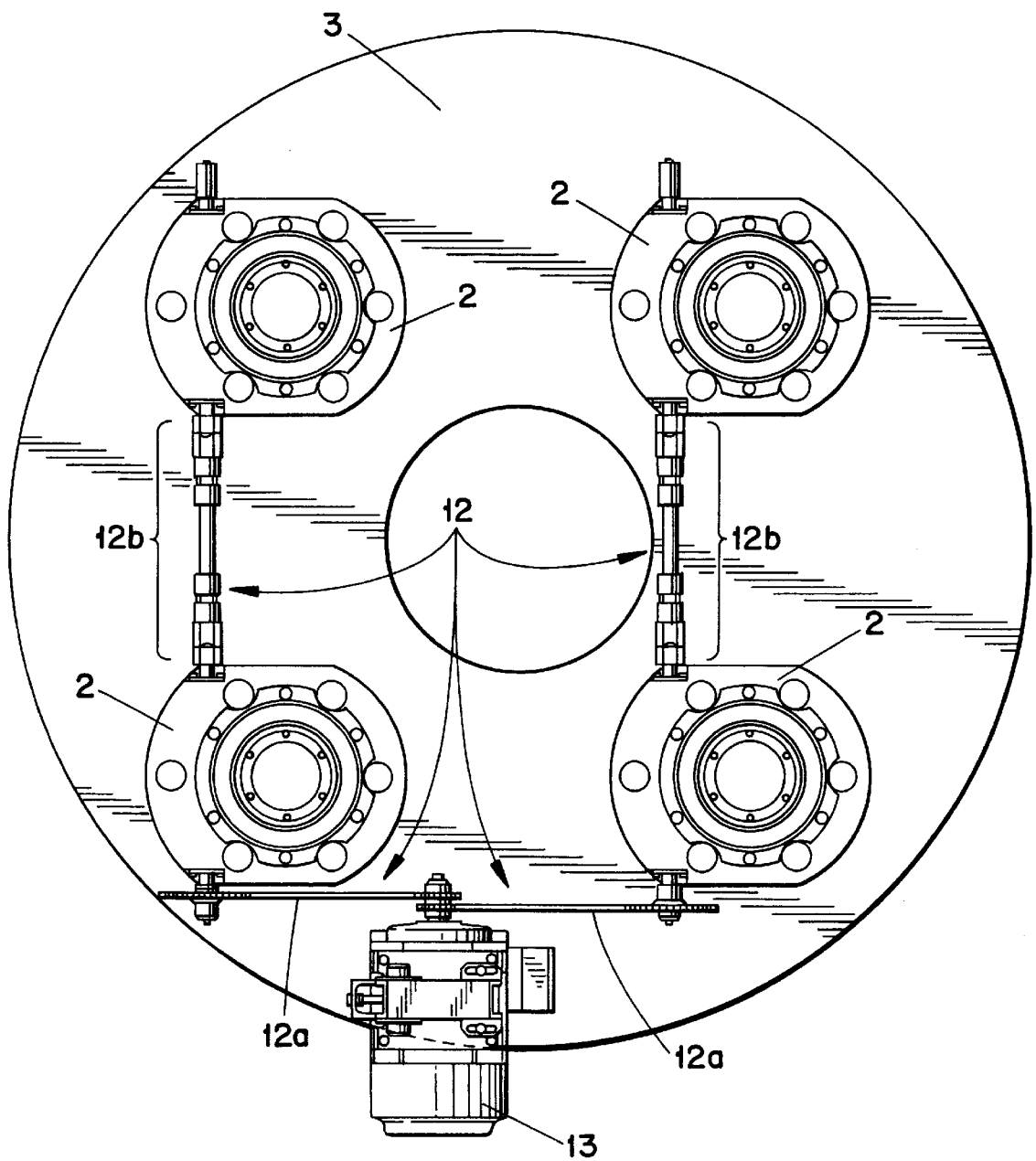
FIG. 3 is a top view of the mutual interconnection of gearing and worm gears for use in the present invention.
Figure 4:
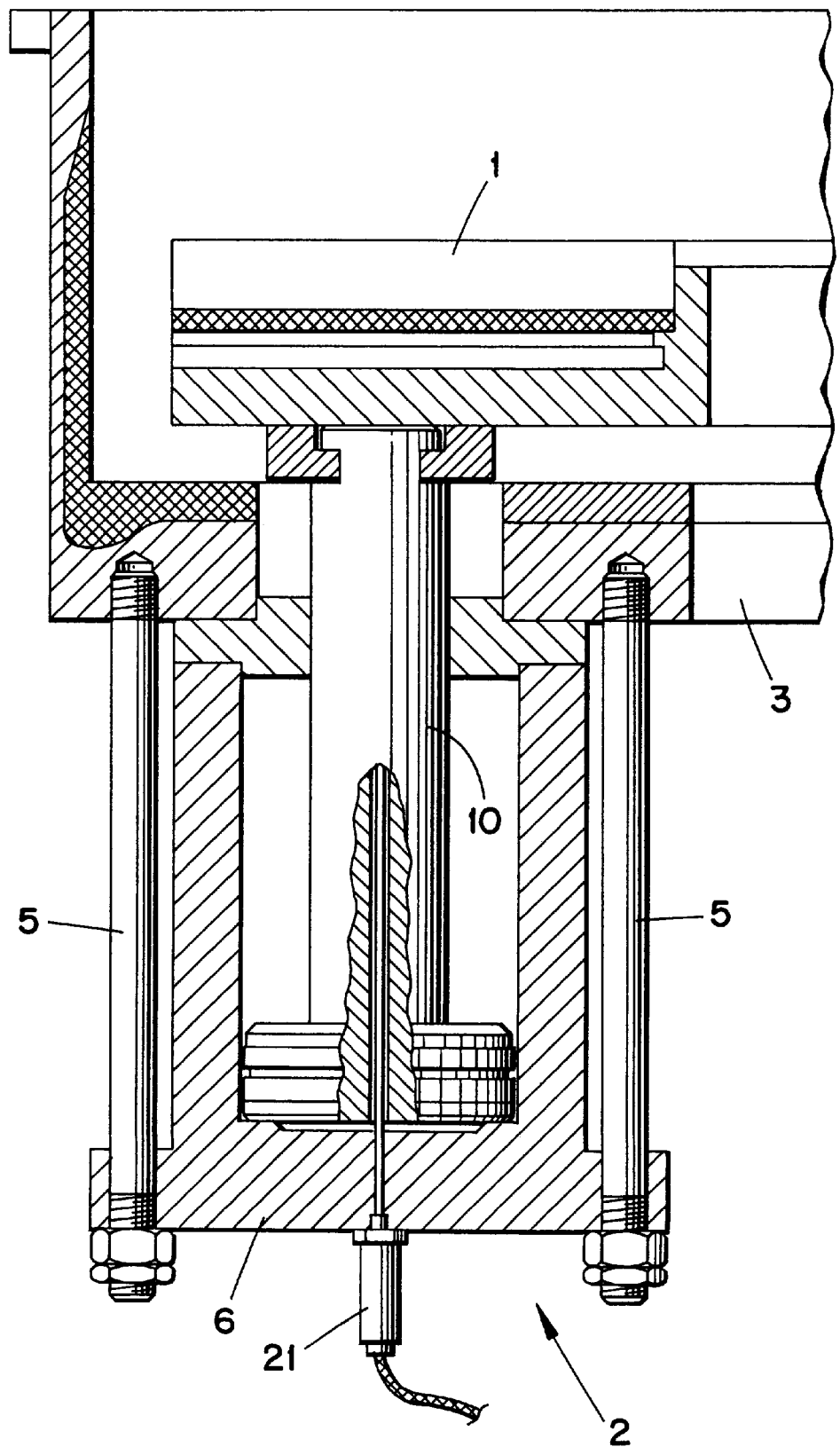
FIG. 4 is a side cross sectional view of a portion of a steam chamber with equipment for adjustment of clamping plate height according to an alternative embodiment of the invention with a sensor.

Simultaneous motion of a plurality of worms 8a associated with a plurality of adjusting screws 4 is induced by gearings 12 shown in FIG. 3. The gearings 12 are connected to a source 13 of torsional moment, which is usually an electric motor. The torsional moment is transmitted to the side worms 8a by means of a system of sprockets and chains 12a. Individual worms 8a are mutually connected by a system of shafts 12b. In the design where the hydraulic cylinders 2 are arranged directly between the lower part of the steam chamber 3 and the clamping plate 1, the hydraulic cylinders will interfere with the stroke sensor 21 of the piston 10. Accordingly, the sensor 21 may be fixed on the barrel 6 of hydraulic cylinder 2 as shown in FIG. 4. The sensor 21 is connected to a control circuit that is not illustrated.

To accommodate a tire mold (not illustrated) on the clamping plate 1, it is necessary, depending on the mold size, to change the height-position of the clamping plate 1 in the steam chamber 2. When a large mold is placed in the steam chamber 2 it is necessary to lower the clamping plate 1 in the lower part of steam chamber, and/or to raise an upper clamping plate in the upper part of steam chamber 3. When the large mold is replaced by a smaller mold the clamping plates are adjusted by moving the upper clamping place downward and/or moving the lower clamping plate 1 upward. The height-motion of the clamping plate 1 within the steam chamber 3 to accommodate molds of different sizes is provided, in the case of hydraulic cylinders 2 provided with sensors 21 of FIG. 4, directly by a system of hydraulic cylinders 2. But if the adjusting screws 4 with the nuts 9 are provided between the individual hydraulic cylinders 2 and clamping plate 1, as shown in FIG. 1, then the change of the height-position of the clamping plate 1 in the steam chamber 3 is induced by mutual motion of the adjusting screws 4 and the nuts 9.

A congruent rotation of the worms 8a is induced by the source 13 of torsional moment that is transmitted to the worms 8a by means of the gears 12. Rotation of the worm 8a turns the worm wheel 8b, and through the spring 11, this motion is transmitted to the nut 9. The nut 9 moves along a thread of the adjusting screw 4 to readjust the height of the clamping plate 1, and along with the clamping plate 1 also adjusts the height of the respective part of the mold. After readjustment of the clamping plate 1 to the required position, the two halves of the steam chamber 3 are moved together by means of a mechanism that is not illustrated in the drawing. A closing force on both parts of the molds, together with a partial motion of the clamping plate 1, are induced by the hydraulic cylinder 2. The piston 10 together with the nut 9 and adjusting screw 4 move by action of a hydraulic medium on the piston. During this motion the worm wheel is allowed to shift axially along the nut 2 and spring 11. At the same time the springs 7 are deflected to return the piston 4 back to the initial position after releasing the hydraulic pressure in the hydraulic cylinder 2.

What is claimed is:

1. An arrangement for adjusting the height of a mold clamping plate in a steam chamber of a curing press comprising:
   a plurality of hydraulic cylinders between an upper part and/or a lower part of the steam chamber and the mold clamping plate; and
   an adjusting screw and nut between the clamping plate and each of the plurality of hydraulic cylinders.

2. The arrangement according to claim 1, wherein the hydraulic cylinders are provided with sensors for sensing the stroke of the hydraulic cylinders.

3. The arrangement according to claim 1, wherein the nut is connected with the hydraulic cylinder and the adjusting screw is connected with the clamping plate.

4. The arrangement according to claim 1, wherein the adjusting screw is encircled by a hollow of a piston of the hydraulic cylinder.

5. The arrangement according to claim 1, wherein the adjusting screw is part of a piston of the hydraulic cylinder.

6. The arrangement according to claim 1, wherein a worm wheel is located in a longitudinally movable manner on the nut with a worm located in a barrel of the hydraulic cylinder.

7. The arrangement according to claim 1, wherein worms rotating the adjusting screws of individual hydraulic cylinders, arc mutually joined by gears connected to a source of torsional moment.

8. A device for adjustment of a height of a mold clamping plate for a curing press steam chamber, the device comprising:
   a plurality of hydraulic cylinders having a piston and a barrel, the piston of the hydraulic cylinder connected to the clamping plate and the barrel of the hydraulic cylinder connected to the steam chamber for adjusting the height of the clamping plate in the steam chamber; and
   an adjusting screw provided between the clamping plate and the hydraulic cylinder.

9. The device according to claim 8, wherein the adjusting screw is longitudinally movable by a worm wheel driven by a source of torsional moment.

10. The device according to claim 8, wherein the adjusting screw is part of the piston.

11. The device according to claim 8, wherein the hydraulic cylinders are provided with sensors for sensing a stroke of the piston.

12. The device according to claim 9, wherein the worm wheel is positioned around the adjusting screw in a longitudinally movable manner.

13. The device according to claim 10, wherein the worm wheel is rotated by a worm gear located in a barrel of the hydraulic cylinder.

14. The device according to claim 13, wherein the worm gear is driven by the source of torsional moment.

15. An arrangement for adjusting the height of a mold clamping plate in the steam chamber of a curing press comprising;
   a plurality of hydraulic cylinders between an upper part and/or a lower part of the steam chamber and the mold clamping plate;
   sensors provided for sensing the stroke of the hydraulic cylinders;
   an adjusting screw and nut between the clamping plate and the hydraulic cylinder; and
   a worm wheel located longitudinally in a movable manner on the nut with a worm located in a barrel of the hydraulic cylinder.

* * * * *